(12) United States Patent
Achten et al.

(10) Patent No.: US 10,300,660 B2
(45) Date of Patent: May 28, 2019

(54) METHOD OF TREATING AT LEAST PART OF THE SURFACE OF A 3D-PRINTED ARTICLE

(71) Applicant: Covestro Deutschland AG, Leverkusen (DE)

(72) Inventors: Dirk Achten, Leverkusen (DE); Thomas Büsgen, Köln (DE); Roland Wagner, Leverkusen (DE); Bettina Mettmann, Dormagen (DE); Levent Akbas, Witten (DE); Julien Guiu, Düsseldorf (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/791,735

(22) Filed: Oct. 24, 2017

(65) Prior Publication Data

US 2018/0111315 A1    Apr. 26, 2018

(30) Foreign Application Priority Data

Oct. 25, 2016   (EP) ..................................... 16195565

(51) Int. Cl.
*B29C 64/118*    (2017.01)
*B29C 64/141*    (2017.01)
(Continued)

(52) U.S. Cl.
CPC .......... *B29C 64/188* (2017.08); *B29C 64/118* (2017.08); *B29C 64/141* (2017.08);
(Continued)

(58) Field of Classification Search
CPC ... B29C 64/188; B29C 64/165; B29C 64/153; B29C 64/141; B29C 64/118;
(Continued)

(56) References Cited

U.S. PATENT DOCUMENTS

| 4,946,535 A | 8/1990 | Meckel et al. |
| 2014/0256902 A1* | 9/2014 | Brauer ................ C08G 18/664 528/83 |

(Continued)

FOREIGN PATENT DOCUMENTS

| DE | 2901774 A1 | 7/1980 |
| DE | 102008027315 A1 | 12/2009 |

(Continued)

*Primary Examiner* — Nathan L Van Sell
(74) *Attorney, Agent, or Firm* — Drinker Biddle & Reath LLP

(57) ABSTRACT

A method of treating at least part of a surface (110) of an article (100) in which an article (100) is treated, at least part of a surface (110, 111) of the article having been produced by an additive manufacturing method from a construction material, and the construction material provides a temperature $T_{G'}$ at which the storage modulus G' of the construction material (determined by dynamic-mechanical analysis according to ISO 6721 at a shear rate of 1/s) is 10 MPa. The article is preferably placed into an evacuable volume and the volume is evacuated. By heating and exerting pressure, the surface is plastically deformed and can be smoothed thereby.

14 Claims, 2 Drawing Sheets

(51) Int. Cl.
*B29C 64/153* (2017.01)
*B29C 64/165* (2017.01)
*B29C 64/188* (2017.01)
*B29C 71/02* (2006.01)
*B33Y 10/00* (2015.01)
*B33Y 40/00* (2015.01)
*B33Y 70/00* (2015.01)
*B33Y 80/00* (2015.01)
*B29K 75/00* (2006.01)

(52) U.S. Cl.
CPC .......... *B29C 64/153* (2017.08); *B29C 64/165* (2017.08); *B33Y 10/00* (2014.12); *B33Y 40/00* (2014.12); *B33Y 70/00* (2014.12); *B33Y 80/00* (2014.12); *B29C 2071/022* (2013.01); *B29K 2075/00* (2013.01); *B29K 2995/007* (2013.01); *B29K 2995/0046* (2013.01)

(58) Field of Classification Search
CPC ... B29C 2071/022; B33Y 10/00; B33Y 40/00; B33Y 70/00; B33Y 80/00; B29K 2995/007; B29K 2075/00; B29K 2995/0046
See application file for complete search history.

(56) References Cited

U.S. PATENT DOCUMENTS

| | | | |
|---|---|---|---|
| 2016/0167297 A1* | 6/2016 | Donaldson | B33Y 10/00 264/129 |
| 2016/0176113 A1* | 6/2016 | Donaldson | B29C 67/0088 428/195.1 |
| 2016/0202101 A1* | 7/2016 | Sparks | C25F 3/16 73/861.355 |
| 2017/0210063 A1* | 7/2017 | Andres | B33Y 40/00 |
| 2017/0225445 A1* | 8/2017 | Gardiner | B33Y 30/00 |

FOREIGN PATENT DOCUMENTS

| | | | |
|---|---|---|---|
| DE | 102015205609 A1 | 9/2016 | |
| WO | 2011089208 A1 | 7/2011 | |
| WO | WO-2016022449 A1 * | 2/2016 | ............ B33Y 40/00 |

* cited by examiner

METHOD OF TREATING AT LEAST PART OF THE SURFACE OF A 3D-PRINTED ARTICLE

CROSS REFERENCE TO RELATED APPLICATIONS

This application is a Paris Convention filing of EP 16195565.3 application, filed Oct. 25, 2016, the entirety of which is incorporated by reference herein.

FIELD OF THE INVENTION

The present invention relates to a method of treating at least part of a surface of an article which has been produced by an additive manufacturing method. The invention further relates to an article thus treated.

BACKGROUND OF THE INVENTION

Articles which have been produced by means of additive manufacturing methods ("3D printing") can have uneven surfaces because of the manner in which they have been produced. With regard to thermoplastic construction materials, this applies to articles produced both by powder-based methods, which have unevenness determined by the particle size in the powder and the layer thickness of each newly applied powder layer, and by melt coating methods, which have unevenness determined by the thickness of the strand applied. However, such unevenness is undesirable from the point of view of tactile and optical properties of the article and because of the fact that uneven surfaces are more easily soiled.

There has been no lack of attempts in the prior art to improve the outward appearance or technical function of 3D-printed articles by an aftertreatment of their surface. A material-removing, mechanical aftertreatment (including sandblasting) is undesirable in many cases. The articles can also be treated with solvent vapours which partly dissolve the surfaces and, after evaporation of the solvent, a smoothed surface is obtained. However, the use of organic solvents is fundamentally problematic.

WO 2011/089208 A1 discloses a process for surface treatment of laser-sintered plastics articles, wherein the following steps are executed: a) smoothing the surfaces of plastics articles; b) washing the smoothed plastics articles; c) coloring and/or coating the plastics articles and d) sealing and/or impregnating the surfaces of the plastics articles.

DE 10 2015 205609 A1 takes another route by applying an additional layer to the surface of the article. It is a feature of the process described therein for powder bed-based additive manufacturing of a component, in which the component is produced layer by layer in a powder bed of powder particles by melting with a beam of energy, that, on conclusion of the production of one layer of the component, a film filled with added particles is applied to the component, wherein the added particles differ from the powder particles in terms of their properties and the film material of the film is removed with the beam of energy, wherein the application of energy by the beam of energy is sufficient to cause permanent bonding of the added particles to the component.

SUMMARY OF THE INVENTION

The present invention provides a method for at least partly overcoming at least one drawback of the state of the art. A further problem addressed by the present invention is that of specifying a method by which the surface presentation of an additively manufactured article is improved.

These and other advantages and benefits of the present invention will be apparent from the Detailed Description of the Invention herein below.

BRIEF DESCRIPTION OF THE FIGURES

The present invention will now be described for purposes of illustration and not limitation in conjunction with the figures, wherein.

DETAILED DESCRIPTION OF THE INVENTION

Figure 1:
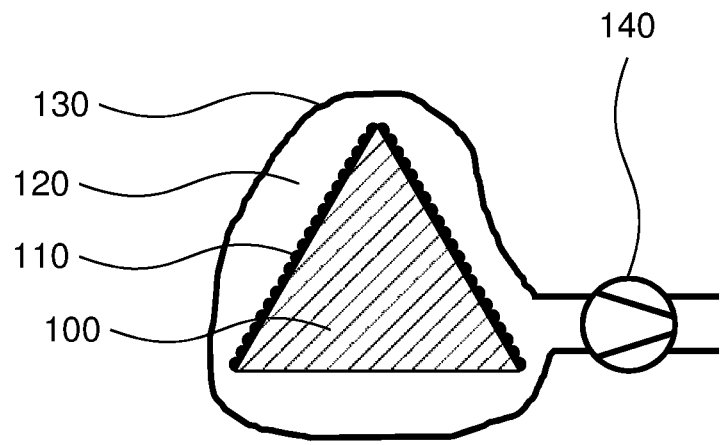
FIG. 1 shows the situation after step II) of the method according to the invention.

The present invention will now be described for purposes of illustration and not limitation.

The problem is solved in accordance with the invention by a method according to claim 1. Advantageous developments are specified in the subsidiary claims. They may be combined as desired, unless the opposite is apparent from the context.

A method of treating at least part of a surface of an article, comprising the step of:

I) providing the article, at least part of a surface of the article having been produced by an additive manufacturing method from a construction material, and the construction material provides a temperature $T_{G'}$ at which the storage modulus G' of the construction material (determined by dynamic-mechanical analysis according to ISO 6721 at a shear rate of 1/s) is 10 MPa;

wherein the treating of at least part of the surface comprises the action of pressure on the surface at a temperature of the surface above the temperature $T_{G'}$.

In step I) of the method, a surface produced by an additive manufacturing method ("3D printing") is provided. The article may be an article produced entirely by an additive manufacturing method. However, the invention also includes the alternative case that a substrate has been provided with a new surface by means of an additive manufacturing method. This surface may be formed by one or more layers of the construction material. The unit of substrate and surface is then also referred to as "article" in the context of the invention.

One example of the latter case is an upper material for shoes, in which one or more layers have been applied to a base material by an additive manufacturing method, especially a melt coating method, and hence this layer is or these layers are the surface to be treated.

The additive manufacturing method may be selected, for example, from melt coating (fused filament fabrication (FFF) or fused deposition modelling, (FDM)), selective laser sintering, selective laser melting and high-speed sintering.

The term "melt coating method" refers to a manufacturing method from the field of additive manufacturing, with which a workpiece is formed layer by layer, for example from a fusible plastic. The plastic may be used with or without further additions such as fibers. Machines for FDM/FFF form part of the machine class of 3D printers. This method is based on the liquefaction of a plastic or wax material in wire form by heating. The material solidifies in the course of final cooling. The material is applied by extrusion with a heating nozzle which is freely movable in relation to a manufacturing plane. It is possible here either for the manufacturing plane to be fixed and for the nozzle to be freely movable or for a nozzle to be fixed and a substrate table (with a manufacturing plane) to be moved, or for both elements, the nozzle and manufacturing plane, to be movable. The speed with which the substrate and nozzle are movable with respect to one another is preferably within a range from 1 to 200 mm/s. According to the application, the layer thickness is within a range from 0.025 and 1.25 mm, and the exit diameter of the jet of material (nozzle outlet diameter) of the nozzle is typically at least 0.05 mm.

In layer-by-layer model production, the individual layers are thus bonded to form a complex part. A body is typically constructed by repeatedly tracing a working plane line by line (forming a layer) and then moving the working plane upward in a "stacking" manner (forming at least one further layer atop the first layer), so as to form a shape layer by layer. The exit temperature of the mixtures of material from the nozzle may, for example, be 80° C. to 420° C. It is additionally possible to heat the substrate table, for example to 20° C. to 250° C. This can prevent excessively rapid cooling of the layer applied, such that a further layer applied thereto bonds adequately to the first layer.

In the context of the present invention, sintering methods are methods which especially utilize thermoplastic powders in order to construct articles layer by layer. In this case, by means of what is called a coater, thin layers of powder are applied and then selectively melted by means of an energy source. The surrounding powder here supports the component geometry. Complex geometries can thus be manufactured more economically than in the FDM method. Moreover, different articles can be arranged or manufactured in a tightly packed manner in what is called the powder bed. Owing to these advantages, powder-based additive manufacturing methods are among the most economically viable additive manufacturing methods on the market. They are therefore used predominantly by industrial users. Examples of powder-based additive manufacturing methods are what are called selective laser sintering (SLS) or high-speed sintering (HSS). They differ from one another in the method for introducing energy for the selective melting into the plastic. In the laser sintering method, the energy is introduced via a deflected laser beam. In what is called the high-speed sintering (HSS) method, the energy is introduced via infrared (IR) sources in combination with an IR absorber selectively printed into the powder bed. What is called selective heat sintering (SHS) utilizes the printing unit of a conventional thermal printer in order to selectively melt thermoplastic powders. Preference is given to selective laser sintering methods (SLS).

For the purposes of the present invention, the construction material is assigned a temperature $T_{G'}$ at which the storage modulus G' of the construction material (determined by dynamic-mechanical analysis according to ISO 6721 at a shear rate of 1/s) is 10 MPa. Without being tied to a theory, it is assumed that the construction material is plastically deformable by application of pressure at least on its surface at temperatures of $\geq T_{G'}$ and correspondingly at a storage modulus G' of $\leq 10$ MPa. This temperature may, for example, be $\geq 101\%$ to $\leq 150\%$, preferably $\geq 105\%$ to $\leq 140\%$ and more preferably $\geq 110\%$ to $\leq 130\%$ of the temperature $T_{G'}$, this value being calculated on the basis of the temperature $T_{G'}$ converted to an absolute temperature (in Kelvin). The temperature may, for example, be $\geq 101\%$ to $\leq 150\%$, preferably $\geq 105\%$ to $\leq 140\%$ and more preferably $\geq 110\%$ to $\leq 130\%$ of the temperature $T_{G'}$, this value being calculated on the basis of the temperature $T_{G'}$ converted to ° C.

Preferably, the temperature at which the construction material is treated at least on its surface in the method according to the invention is within a range from 1 to 100 K, or preferably within a range from 2 to 90 K, or preferably within a range from 3 to 80 K, or preferably within a range from 5 to 70 K, or preferably within a range from 7 to 60 K, or preferably within a range from 10 to 50 K, higher than $T_{G'}$ of the construction material.

The action of pressure may, for example, be by calendering or pressing of a heated surface, with or without separating layers. The pressure exerted on the surface of the article may be $\geq 10$ kPa to $\leq 1000$ kPa. The pressure is preferably $\geq 100$ kPa to $\leq 750$ kPa, more preferably $\geq 250$ kPa to $\leq 500$ kPa.

The construction material preferably comprises a thermoplastic elastomer (more preferably a thermoplastic polyurethane elastomer) having an elongation at break in the tensile test according to DIN 53504 of $\geq 50\%$. In addition, the construction material may have, for example, a compression set after 40% compression (DIN ISO 815-1) of $\leq 5\%$.

The construction material may also comprise further additives such as fillers, stabilizers and the like, but also further polymers. The total content of additives in the construction material may, for example, be $\geq 0.1\%$ by weight to $\leq 10\%$ by weight, preferably $\geq 1\%$ by weight to $\leq 5\%$ by weight.

A preferred method of treating at least part of the surface of an article comprises the step of:

I) providing the article, at least part of a surface of the article having been produced by an additive manufacturing method from a construction material, and the construction material provides a temperature $T_{G'}$ at which the storage modulus G' of the construction material (determined by dynamic-mechanical analysis according to ISO 6721 at a shear rate of 1/s) is 10 MPa.

The preferred method further comprises the steps of:

II) placing the article into an evacuable volume having a boundary comprising flexible sections intended for contact with the surface of the article, wherein the material for the boundary is selected such that it does not enter into any permanent bond with the construction material that has been heated above its temperature $T_{G'}$ and then cooled below its temperature $T_{G'}$;

III) evacuating the volume, such that at least some of the flexible sections of the boundary of the volume come into contact with the surface of the article;

IV) heating at least a portion of the surface (110) of the article, while the volume still remains evacuated, for a predetermined period of time to a temperature above the temperature $T_{G'}$;

V) cooling the surface of the article to a temperature below the temperature $T_{G'}$;

VI) removing the article from the volume.

The above remarks relating to step I) of the method do of course also apply to this preferred embodiment.

In step II) of the method, the article is placed into an evacuable volume. The volume is bounded by a boundary comprising flexible sections. This can be effected in an apparatus suitable for performance of resin infusion methods in the production of fiber composite materials. Another suitable system is a vacuum lamination system, especially a vacuum lamination system having a heatable metal base. In such an apparatus, the base of the infusion chamber onto which the article is placed can constitute an inflexible section of the boundary, and a vacuum film which is placed onto the article and provided with appropriate seals with respect to the base can constitute a flexible section of the boundary. In order to prevent adhesion of the boundary to the article, the material for the boundary (especially of the part of the boundary which touches the article in the course of the method) is selected such that no permanent bond is formed with the construction material in the course of performance of the method. In this context, a permanent bond is understood to mean a bond which cannot be parted without destruction in respect of the article, the surface of the article, the boundary or a combination of these, or which cannot be parted without deformation in respect of the article or the surface of the article. It may further be the case that the detachment of the boundary from the article is supported by the use of mold release agents such as PTFE spray.

In step III) of the method, the volume is evacuated, such that at least the flexible sections of the boundary envelop the article and exert pressure on the surface of the article. Within the evacuated volume, there may be a pressure, for example, of ≤500 mbar, preferably ≤10 mbar and more preferably ≤1 mbar. Further preferably, there is a pressure in the evacuated volume of ≤200 mbar, or preferably of ≤100 mbar.

While a vacuum still remains applied to the volume, the surface of the article is heated in step IV). The invention also includes the possibility that regions of the article beneath the surface are also heated. The heating can be conducted, for example, for a predetermined period of time of ≥5 seconds to ≤60 minutes, preferably ≥1 minute to ≤45 minutes, or preferably ≥2 minutes to ≤30 minutes and more preferably ≥10 minutes to ≤30 minutes. The temperature to which the surface is heated during the predetermined period of time may, for example, be ≥101% to ≤150%, preferably ≥105% to ≤140% and more preferably ≥110% to ≤130% of the temperature $T_{G'}$, this value being calculated on the basis of the temperature $T_{G'}$ converted to an absolute temperature (in Kelvin). The heating of the surface can be achieved, for example, by placing the assembly composed of article and boundary into a heatable chamber such as an oven or heating it by means of an IR source. The temperature to which the surface is heated during the predetermined period of time may, for example, be ≥101% to ≤150%, preferably ≥105% to ≤140% and more preferably ≥110% to ≤130% of the temperature $T_{G'}$, this value being calculated on the basis of the temperature $T_{G'}$ calculated in or converted to ° C.

The heating of the surface to a temperature above $T_{G'}$, in combination with the pressure exerted on the surface of the article by the boundary, results in matching of the surface contour of the article to the surface contour of the boundary. Especially in the case of smooth boundaries, the surface of the article can be smoothed.

After the predetermined period of time has elapsed, in step V), the surface of the article is cooled to a temperature below $T_{G'}$. The cooling can be effected passively by switching a heater off or actively by using a cooling fluid. It is possible that the cooling is effected while a vacuum is still being applied to the volume.

Alternatively, it is possible that the vacuum is first broken prior to cooling, in that the ingress of air into the volume is permitted.

Appropriately, the surface is cooled to a temperature of ≥10% to ≤90%, preferably ≥20% to ≤80% and more preferably ≥30% to ≤60% of the temperature $T_{G'}$, before the article is then removed from the volume in step VI). Here too, this value is calculated on the basis of the temperature $T_{G'}$ converted to an absolute temperature (in Kelvin). Preferably, the surface is cooled to a temperature of ≥10% to ≤90%, preferably ≥20% to ≤80% and more preferably ≥30% to ≤60% of the temperature $T_{G'}$, before the article is then removed from the volume in step VI). Here, this value is calculated on the basis of the temperature $T_{G'}$ calculated in or converted to ° C.

Preferably, the surface is cooled to a temperature of at least 10° C. below $T_{G'}$, preferably at least 20° C. below $T_{G'}$ and most preferably at least 30° C. below $T_{G'}$, and further preferably the temperature is not cooled below the dew point and most preferably not below 0° C.

Overall, the method according to the invention thus allows an improvement in the appearance of the surfaces of 3D-printed articles without needing to use solvents or material-removing methods.

In a preferred embodiment, the boundary of the evacuable volume does not have any inflexible sections. For instance, the boundary of the evacuable volume may be executed, for example, as a flexible plastics pouch.

In a further preferred embodiment, the material of the flexible sections of the boundary of the evacuable volume is selected from the group comprising: polyethylene, polypropylene, polyvinyl chloride, polytetrafluoroethylene or a combination of at least two of these. It is possible that the aforementioned polymers are also parts of a layer composite in which the side of the boundary facing the article is formed from one or more of these polymers.

In a further preferred embodiment, the material of the flexible sections of the boundary of the evacuable volume is selected from the group comprising: crosslinked polyethylene, crosslinked polypropylene, crosslinked polyvinyl chloride, crosslinked polytetrafluoroethylene, silicone rubber, fluorosilicone rubber, fluoro rubber or a combination of at least two of these. It is possible that the aforementioned polymers are also parts of a layer composite in which the side of the boundary facing the article is formed from one or more of these polymers.

Preferably, the material of the flexible section has been finished with an anti-adhesive coating, preferably based on silicone or fluorosilicone.

In a further preferred embodiment, the boundary comprises one or more heating elements. These may be heating wires or ducts for a heating fluid that have been incorporated into the boundary.

Preferably, in step II), the flexible sections of the boundary exert an average pressure of ≥10 kPa to ≤1000 kPa on the surface of the article. The pressure is preferably ≥50 kPa to ≤750 kPa, more preferably ≥100 kPa to ≤500 kPa. The buildup of an appropriate pressure can be supported by positioning the assembly comprising the article and boundary into an elevated pressure chamber.

In a further preferred embodiment, in step II), the flexible sections of the boundary exert an average pressure of ≥10 kPa to ≤1000 kPa on the surface of the article. The pressure is preferably ≥100 kPa to ≤750 kPa, more preferably ≥250 kPa to ≤500 kPa. The buildup of an appropriate pressure can be supported by positioning the assembly comprising the article and boundary into an elevated pressure chamber.

In a further preferred embodiment, the production of the article by means of the additive manufacturing method comprises the steps of:

applying a layer of particles including the construction material to a target surface;

introducing energy into a selected portion of the layer corresponding to a cross section of the article such that the particles in the selected portion are bonded;

repeating the steps of applying and introducing energy for a multitude of layers, such that the bonded portions of the adjacent layers become bonded in order to form the article.

This embodiment involves a powder sintering or powder fusion method. If the number of repetitions for applying and irradiation is sufficiently low, it is also possible to make reference to a two-dimensional article which is to be constructed. Such a two-dimensional article can also be characterized as a coating. For example, for construction thereof, ≥2 to ≤20 repetitions for application and irradiation can be conducted.

It is preferable that at least 90% by weight of the particles have a particle diameter of ≤0.25 mm, preferably ≤0.2 mm, more preferably ≤0.15 mm. The energy source for bonding of the particles may be electromagnetic energy, for example, UV to IR light. An electron beam is also conceivable. The bonding of the particles in the irradiated portion of the particle layer is typically effected through (partial) melting of a (semi-)crystalline material and bonding of the material in the course of cooling. Alternatively, it is possible that other transformations of the particles such as a glass transition, i.e. the heating of the material to a temperature above the glass transition temperature, bring about bonding of the particles of the particles to one another.

In a further preferred embodiment, the introducing of energy into a selected portion of the layer corresponding to a cross section of the article such that the particles in the selected portion are bonded comprises the following step:

irradiating a selected portion of the layer corresponding to a cross section of the article with a beam of energy, such that the particles in the selected portion are bonded.

This form of the method can be regarded as a selective sintering method, especially as a selective laser sintering method (SLS). The beam of energy for bonding of the particles may be a beam of electromagnetic energy, for example a "light beam" of UV to IR light. Preferably, the beam of energy is a laser beam, more preferably having a wavelength between 600 nm and 15 µm. The laser may take the form of a semiconductor laser or of a gas laser. An electron beam is also conceivable.

In a further preferred embodiment, the introducing of energy into a selected portion of the layer corresponding to a cross section of the article such that the particles in the selected portion are bonded comprises the following steps:

applying a liquid to a selected portion of the layer corresponding to a cross section of the article, where said liquid increases the absorption of the energy introduced in the regions of the layer with which it comes into contact relative to the regions with which it does not come into contact;

irradiating the layer such that the particles in regions of the layer that come into contact with the liquid are bonded to one another and the particles in regions of the layer that do not come into contact with the liquid are not bonded to one another.

In this embodiment, for example, a liquid comprising an IR absorber can be applied to the layer by means of inkjet methods. The irradiation of the layer leads to selective heating of those particles that are in contact with the liquid including the IR absorber. In this way, bonding of the particles can be achieved. Optionally, it is additionally possible to use a second liquid complementary to the energy-absorbing liquid in terms of its characteristics with respect to the energy used. In regions in which the second liquid is applied, the energy used is not absorbed but reflected. The regions beneath the second liquid are thus shaded. In this way, the separation sharpness between regions of the layer that are to be melted and not to be melted can be increased.

In a further preferred embodiment, the production of the article by means of the additive manufacturing method comprises the steps of:

applying a filament of an at least partly molten construction material to a carrier, such that a layer of the construction material is obtained, corresponding to a first selected cross section of the article;

optionally applying a filament of the at least partly molten construction material to a previously applied layer of the construction material, such that a further layer of the construction material is obtained, which corresponds to a further selected cross section of the article and which is bonded to the layer applied beforehand;

optionally repeating the step of applying a filament of the at least partly molten construction material to a previously applied layer of the construction material until the article has been formed.

This embodiment is a melt coating or fused deposition modelling (FDM) method. If the number of repetitions for the applying is sufficiently low, it is also possible to make reference to a two-dimensional article which is to be constructed. Such a two-dimensional article can also be characterized as a coating. For example, for construction thereof, ≥1 to ≤20 repetitions for the application can be conducted.

The individual filaments which are applied may have a diameter of ≥30 µm to ≤2000 µm, preferably ≥40 µm to ≤1000 µm and more preferably ≥50 µm to 500 µm.

The first step of this embodiment of the method relates to the construction of the first layer on a carrier. Subsequently, the second step, in which further layers are applied to previously applied layers of the construction material, is executed until the desired end result in the form of the article is obtained. The at least partly molten construction material bonds to existing layers of the material in order to form a structure in z direction. But it is possible that just one layer of the construction material is applied to a carrier.

In a further preferred embodiment, the construction material comprises a thermoplastic polyurethane elastomer having a melting range (DSC, differential scanning calorimetry; second heating at heating rate 5 K/min) of ≥20° C. to ≤200° C. (preferably ≥40° C. to ≤190° C., more preferably ≥70° C. to ≤180° C.), a Shore hardness according to DIN ISO 7619-1 of ≥40 A to ≤85 D (preferably ≥50 Shore A to ≤80 Shore D, more preferably ≥60 Shore A to ≤75 Shore D) and a melt volume rate (MVR) according to ISO 1133 (190° C., 10 kg) of ≥25 to ≤90 (preferably ≥30 to ≤150, more preferably ≥35 to ≤100) cm$^3$/10 min.

In this DSC analysis, the material is subjected to the following temperature cycle: 1 minute at minus 60° C., then heating to 220° C. at 20 Kelvin/minute, then cooling to minus 60° C. at 5 Kelvin/minute, then 1 minute at minus 60° C., then heating to 220° C. at 20 Kelvin/minute. Alternatively, the heating in the last step can also be to 240° C. at 20 Kelvin/minute.

In a further preferred embodiment, the construction material comprises a thermoplastic polyurethane elastomer having a melting range (DSC, differential scanning calorimetry; second heating at a heating rate 5 K/min) of ≥20° C. to ≤200° C. (preferably ≥40° C. to ≤190° C., more preferably ≥70° C. to ≤180° C.), or a melting range (DSC, differential scanning calorimetry; second heating at a heating rate 5 K/min) of ≥20° C. to ≤240° C. (preferably ≥40° C. to ≤220° C., more preferably ≥70° C. to ≤200° C.), a Shore hardness according to DIN ISO 7619-1 to ≥40 A to ≤85 D (preferably ≥50 Shore A to ≤80 Shore D, more preferably ≥60 Shore A to ≤75 Shore D), a melt volume rate (MVR) according to ISO 1133 (10 kg) at a temperature, T, of 5 to 15 (preferably ≥6 to ≤12, more preferably ≥7 to ≤10) cm$^3$/10 min and a change in the melt volume rate (10 kg) in the event of an increase in this temperature, T, by 20° C. of ≤90 (preferably ≤70, more preferably ≤50) cm$^3$/10 min.

In this DSC analysis too, the material is subjected to the following temperature cycle: 1 minute at minus 60° C., then heating to 220° C. at 20 Kelvin/minute, then cooling to minus 60° C. at 5 Kelvin/minute, then 1 minute at minus 60° C., then heating to 200° C. at 20 Kelvin/minute.

Alternatively, in this DSC analysis, the material is subjected to the following temperature cycle: 1 minute at minus 60° C., then heating to 240° C. at 20 Kelvin/minute, then cooling to minus 60° C. at 5 Kelvin/minute, then 1 minute at minus 60° C., then heating to 240° C. at 20 Kelvin/minute.

The thermoplastic elastomer, preferably a thermoplastic polyurethane elastomer, preferably has uniform melting characteristics. This thermoplastic elastomer, preferably a thermoplastic polyurethane elastomer, has uniform melting characteristics. Melting characteristics are determined via the change in MVR (melt volume rate) to ISO 1133 with a preheating time of 5 minutes and 10 kg as a function of temperature. Melting characteristics are considered to be "uniform" when the MVR at a starting temperature $T_x$ has a starting value of 5 to 15 cm$^3$/10 min and increases by not more than 90 cm$^3$/10 min as a result of an increase in temperature by 20° C. to $T_{x+20}$.

In a further preferred embodiment, the construction material comprises a thermoplastic polyurethane elastomer obtainable from the reaction of the following components:
a) at least one organic diisocyanate
b) at least one compound having groups reactive toward isocyanate groups and having a number-average molecular weight ($M_n$) of ≥500 g/mol to ≤6000 g/mol and a number-average functionality of the totality of the components covered by b) of ≥1.8 to ≤2.5
c) at least one chain extender having a molecular weight (Mn) of 60-450 g/mol and a number-average functionality of the totality of the chain extenders covered by c) of 1.8 to 2.5.

For synthesis of this thermoplastic polyurethane elastomer (TPU), specific examples of isocyanate components covered by a) include: aliphatic diisocyanates such as ethylene diisocyanate, tetramethylene 1,4-diisocyanate, pentamethylene 1,5-diisocyanate, hexamethylene 1,6-diisocyanate, dodecane 1,12-diisocyanate, cycloaliphatic diisocyanates such as isophorone diisocyanate, cyclohexane 1,4-diisocyanate, 1-methylcyclohexane 2,4-diisocyanate and 1-methylcyclohexane 2,6-diisocyanate and the corresponding isomer mixtures, dicyclohexylmethane 4,4'-diisocyanate, dicyclohexylmethane 2,4'-diisocyanate and dicyclohexylmethane 2,2'-diisocyanate and the corresponding isomer mixtures, and also aromatic diisocyanates such as tolylene 2,4-diisocyanate, mixtures of tolylene 2,4-diisocyanate and tolylene 2,6-diisocyanate, diphenylmethane 4,4'-diisocyanate, diphenylmethane 2,4'-diisocyanate and diphenylmethane 2,2'-diisocyanate, mixtures of diphenylmethane 2,4'-diisocyanate and diphenylmethane 4,4'-diisocyanate, urethane-modified liquid diphenylmethane 4,4'-diisocyanates or diphenylmethane 2,4'-diisocyanates, 4,4'-diisocyanato-1,2-diphenylethane and naphthylene 1,5-diisocyanate. Preference is given to using hexamethylene 1,6-diisocyanate, cyclohexane 1,4'-diisocyanate, isophorone diisocyanate, dicyclohexylmethane diisocyanate, diphenylmethane diisocyanate isomer mixtures having a diphenylmethane 4,4'-diisocyanate content of more than 96% by weight and especially diphenylmethane 4,4'-diisocyanate and naphthylene 1,5-diisocyanate. These diisocyanates can be used individually or in the form of mixtures with one another. They may also be used together with up to 15 mol % (based on total diisocyanate) of a polyisocyanate, but the maximum amount of polyisocyanate that may be added is such as to result in a product that is still thermoplastically processable. Examples of polyisocyanates are triphenylmethane 4,4',4"-triisocyanate and polyphenylpolymethylene polyisocyanates.

Examples of longer-chain isocyanate-reactive compounds covered by b) include those having an average of at least 1.8 to 3.0 Zerewitinoff-active hydrogen atoms and a number-average molecular weight of 500 to 10 000 g/mol. This includes, in addition to compounds having amino groups, thiol groups or carboxyl groups, especially compounds having two to three, preferably two, hydroxyl groups, specifically those having number-average molecular weights Mn of 500 to 6000 g/mol, more preferably those having a number-average molecular weight Mn of 600 to 4000 g/mol, for example hydroxyl-containing polyester polyols, polyether polyols, polycarbonate polyols and polyester polyamides. Suitable polyester diols can be prepared by reacting one or more alkylene oxides having 2 to 4 carbon atoms in the alkylene radical with a starter molecule containing two active hydrogen atoms in bonded form. Examples of alkylene oxides include: ethylene oxide, 1,2-propylene oxide, epichlorohydrin and 1,2-butylene oxide and 2,3-butylene oxide. Preference is given to using ethylene oxide, propylene oxide and mixtures of 1,2-propylene oxide and ethylene oxide. The alkylene oxides may be used individually, in alternating succession or as mixtures. Examples of useful starter molecules include water, amino alcohols such as N-alkyldiethanolamines, for example N-methyldiethanolamine, and diols such as ethylene glycol, 1,3-propylene glycol, butane-1,4-diol and hexane-1,6-diol. It is optionally also possible to use mixtures of starter molecules. Suitable polyether diols further include the hydroxyl-containing polymerization products of tetrahydrofuran. It is also possible to use trifunctional polyethers in proportions of 0% to 30% by weight, based on the bifunctional polyether diols, but at most in such an amount as to result in a product that is still thermoplastically processable. The essentially linear polyether diols preferably have number-average molecular weights, n, of 500 to 6000 g/mol. They can be used either individually or in the form of mixtures with one another.

Suitable polyester diols can be prepared, for example, from dicarboxylic acids having 2 to 12 carbon atoms, preferably 4 to 6 carbon atoms, and polyhydric alcohols. Examples of useful dicarboxylic acids include: aliphatic dicarboxylic acids such as succinic acid, glutaric acid, adipic acid, suberic acid, azelaic acid and sebacic acid, or aromatic dicarboxylic acids such as phthalic acid, isophthalic acid and terephthalic acid. The dicarboxylic acids may be used individually or as mixtures, for example in the form of a succinic acid, glutaric acid and adipic acid mixture. For preparation of the polyester diols, it may in some cases be advantageous to use, rather than the dicarboxylic acids, the corresponding dicarboxylic acid derivatives such as carboxylic diesters having 1 to 4 carbon atoms in the alcohol radical, carboxylic anhydrides or carbonyl chlorides. Examples of polyhydric alcohols are glycols having 2 to 10, preferably 2 to 6, carbon atoms, for example ethylene glycol, diethylene glycol, butane-1,4-diol, pentane-1,5-diol, hexane-1,6-diol, decane-1,10-diol, 2,2-dimethylpropane-1,3-diol, propane-1,3-diol or dipropylene glycol. Depending on the desired properties, the polyhydric alcohols may be used alone or in admixture with one another. Also suitable are esters of carbonic acid with the diols mentioned, especially those having 4 to 6 carbon atoms, such as butane-1,4-diol or hexane-1,6-diol, condensation products of ω-hydroxycarboxylic acids such as ω-hydroxycaproic acid, or polymerization products of lactones, for example, optionally substituted ω-caprolactone. Polyester diols used are preferably ethanediol polyadipates, butane-1,4-diol polyadipates, ethanediol butane-1,4-diol polyadipates, hexane-1,6-diol neopentyl glycol polyadipates, hexane-1,6-diol butane-1,4-diol polyadipates, and polycaprolactones. The polyester diols preferably have number-average molecular weights Mn of 450 to 6000 g/mol and can be employed individually or in the form of mixtures with one another.

The chain extenders covered by c) have an average of 1.8 to 3.0 Zerewitinoff-active hydrogen atoms and have a molecular weight of 60 to 450 g/mol. This is understood to mean not only compounds having amino groups, thiol groups or carboxyl groups, but also those having two to three, preferably two, hydroxyl groups.

Chain extenders used are preferably aliphatic diols having 2 to 14 carbon atoms, for example ethanediol, propane-1,2-diol, propane-1,3-diol, butane-1,4-diol, butane-2,3-diol, pentane-1,5-diol, hexane-1,6-diol, diethylene glycol and dipropylene glycol. Also suitable, however, are diesters of terephthalic acid with glycols having 2 to 4 carbon atoms, for example, terephthalic acid bis-ethylene glycol or terephthalic acid bis-butane-1,4-diol, hydroxyalkylene ethers of hydroquinone, for example 1,4-di(b-hydroxyethyl) hydroquinone, ethoxylated bisphenols, for example 1,4-di(b-hydroxyethyl)bisphenol A, (cyclo)aliphatic diamines, such as isophoronediamine, ethylenediamine, propylene-1,2-diamine, propylene-1,3-diamine, N-methylpropylene-1,3-diamine, N,N'-dimethylethylenediamine and aromatic diamines such as tolylene-2,4-diamine, tolylene-2,6-diamine, 3,5-diethyltolylene-2,4-diamine or 3,5-diethyltolylene-2,6-diamine or primary mono-, di-, tri- or tetraalkyl-substituted 4,4'-diaminodiphenylmethanes. Chain extenders used with particular preference are ethanediol, butane-1,4-diol, hexane-1,6-diol, 1,4-di(β-hydroxyethyl)hydroquinone or 1,4-di(β-hydroxyethyl)bisphenol A. Mixtures of the abovementioned chain extenders may also be employed.

In addition, relatively small amounts of triols may also be added.

Compounds that are monofunctional toward isocyanates, covered by f), can be used in proportions of up to 2% by weight, based on TPU, as what are called chain terminators. Suitable examples include monoamines such as butyl- and dibutylamine, octylamine, stearylamine, N-methylstearylamine, pyrrolidine, piperidine or cyclohexylamine, monoalcohols such as butanol, 2-ethylhexanol, octanol, dodecanol, stearyl alcohol, the various amyl alcohols, cyclohexanol and ethylene glycol monomethyl ether.

The isocyanate-reactive substances should preferably be chosen such that their number-average functionality does not significantly exceed two if thermoplastically processible polyurethane elastomers are to be prepared. If higher-functionality compounds are used, the overall functionality should be lowered correspondingly by means of compounds having a functionality of <2.

The relative amounts of isocyanate groups and isocyanate-reactive groups are preferably chosen such that the ratio is 0.9:1 to 1.2:1, preferably 0.95:1 to 1.1:1.

The thermoplastic polyurethane elastomers used in accordance with the invention may comprise, as auxiliaries and/or additives, up to a maximum of 50% by weight, based on the total amount of TPUs, of the customary auxiliaries and additives. Typical auxiliaries and additives are catalysts, antiblocking agents, inhibitors, pigments, colorants, flame retardants, stabilizers against ageing and weathering effects and against hydrolysis, light, heat and discoloration, plasticizers, lubricants and demoulding agents, fungistatic and bacteriostatic substances, reinforcing agents and inorganic and/or organic fillers and mixtures thereof.

Examples of the additives are lubricants, such as fatty acid esters, metal soaps thereof, fatty acid amides, fatty acid ester amides and silicone compounds, and reinforcing agents, for example, fibrous reinforcing agents, such as inorganic fibers, which are produced according to the prior art and can also be provided with a size. Further details of the auxiliaries and additives mentioned can be found in the specialist literature, for example, the monograph by J. H. Saunders and K. C. Frisch: "High Polymers", volume XVI, Polyurethane, parts 1 and 2, Interscience Publishers 1962 and 1964, Taschenbuch der Kunststoff-Additive [Handbook of Plastics Additives] by R. Gachter and H. Müller (Hanser Verlag Munich 1990), or DE-A 29 01 774.

Suitable catalysts are the customary tertiary amines known from the prior art, for example, triethylamine, dimethylcyclohexylamine, N-methylmorpholine, N,N'-dimethylpiperazine, 2-(dimethylaminoethoxy)ethanol, diazabicyclo[2.2.2]octane and similar and also in particular organic metal compounds such as titanic esters, iron compounds or tin compounds such as tin diacetate, tin dioctoate, tin dilaurate or the dialkyltin salts of aliphatic carboxylic acids such as dibutyltin diacetate or dibutyltin dilaurate or similar. Preferred catalysts are organic metal compounds, in particular titanic esters, iron compounds and tin compounds. The total amount of catalysts in the TPUs used is generally about 0% to 5% by weight, preferably 0% to 2% by weight, based on the total amount of TPUs.

In a further preferred embodiment, the construction material comprises a thermoplastic polyurethane elastomer having a melting range (DSC, differential scanning calorimetry; 2nd heating at heating rate 5 K/min.) of ≥20° C. to ≤100° C. and a magnitude of the complex viscosity 10 (determined by viscometry measurement in the melt with a plate/plate oscillation shear viscometer at 100° C. and a shear rate of 1/s) of ≥10 Pas to ≤1 000 000 Pas.

This thermoplastic elastomer has a melting range of ≥20° C. to ≤100° C., preferably of ≥25° C. to ≤90° C. and more preferably of ≥30° C. to ≤80° C. In the DSC analysis for determination of the melting range, the material is subjected to the following temperature cycle: 1 minute at −60° C., then heating to 200° C. at 5 Kelvin/minute, then cooling to −60° C. at 5 Kelvin/minute, then 1 minute at −60° C., then heating to 200° C. at 5 Kelvin/minute.

It is possible that the temperature interval between the start of the melting operation and the end of the melting operation as determinable by the above DSC protocol is ≤20° C., preferably ≤10° C. and more preferably ≤5° C.

This thermoplastic elastomer also has a magnitude of the complex viscosity |η*| (determined by viscometry measurement in the melt with a plate/plate oscillation viscometer according to ISO 6721-10 at 100° C. and a shear rate of 1/s) of ≥10 Pas to ≤1 000 000 Pas. Preferably, |η*| is ≥100 Pas to ≤500 000 Pas, more preferably ≥1000 Pas to ≤200 000 Pas.

The magnitude of the complex viscosity |η*| describes the ratio of the viscoelastic moduli G' (storage modulus) and G" (loss modulus) to the excitation frequency ω in a dynamic-mechanical material analysis:

$$|\eta^*| = \sqrt{\left[\left(\frac{G'}{\omega}\right)^2 + \left(\frac{G''}{\omega}\right)^2\right]} = \frac{|G^*|}{\omega}$$

In a further preferred embodiment, the construction material comprises a thermoplastic polyurethane elastomer obtainable from the reaction of a polyisocyanate component and a polyol component, said polyol component comprising a polyester polyol having a pour point (ASTM D5985) of ≥25° C.

If appropriate, in the reaction to give this polyurethane, it is also possible to use diols from the molecular weight range of ≥62 to ≤600 g/mol as chain extenders.

This polyisocyanate component may comprise a symmetric polyisocyanate and/or a nonsymmetric polyisocyanate. Examples of symmetric polyisocyanates are 4,4'-MDI and HDI.

In the case of nonsymmetric polyisocyanates, the steric environment of one NCO group in the molecule is different from the steric environment of a further NCO group. In that case, one isocyanate group reacts more quickly with groups reactive toward isocyanates, for example, OH groups, while the remaining isocyanate group is less reactive. One consequence of the nonsymmetric structure of the polyisocyanate is that the polyurethanes formed with these polyisocyanates also have a less linear structure.

Examples of suitable nonsymmetric polyisocyanates are selected from the group comprising: 2,2,4-trimethylhexamethylene diisocyanate, ethylethylene diisocyanate, nonsymmetric isomers of dicyclohexylmethane diisocyanate ($H_{12}$-MDI), nonsymmetric isomers of 1,4-diisocyanatocyclohexane, nonsymmetric isomers of 1,3-diisocyanatocyclohexane, nonsymmetric isomers of 1,2-diisocyanatocyclohexane, nonsymmetric isomers of 1,3-diisocyanatocyclopentane, nonsymmetric isomers of 1,2-diisocyanatocyclopentane, nonsymmetric isomers of 1,2-diisocyanatocyclobutane, 1-isocyanatomethyl-3-isocyanato-1,5,5-trimethylcyclohexane (isophorone diisocyanate, IPDI), 1-methyl-2,4-diisocyanatocyclohexane, 1,6-diisocyanato-2,2,4-trimethylhexane, 1,6-diisocyanato-2,4,4-trimethylhexane, 5-isocyanato-1-(3-isocyanatoprop-1-yl)-1,3,3-trimethylcyclohexane, 5-isocyanato-1-(4-isocyanatobut-1-yl)-1,3,3-trimethylcyclohexane, 1-isocyanato-2-(3-isocyanatoprop-1-yl)cyclohexane, 1-isocyanato-2-(2-isocyanatoeth-1-yl)cyclohexane, 2-heptyl-3,4-bis(9-isocyanatononyl)-1-pentylcyclohexane, norbornane diisocyanatomethyl, diphenylmethane 2,4'-diisocyanate (MDI), tolylene 2,4- and 2,6-diisocyanate (TDI), derivatives of the diisocyanates listed, especially dimerized or trimerized types, or a combination of at least two of these. Preference is given to 4,4'-MDI or a mixture comprising IPDI and HDI and/or PDI as polyisocyanate component.

This polyol component has a polyester polyol having a no-flow point (ASTM D5985) of ≥25° C., preferably ≥35° C., more preferably ≥35° C. to ≤55° C. To determine the no-flow point, a test vessel containing the sample is set in slow rotation (0.1 rpm). A flexibly mounted measurement head dips into the sample and, on attainment of the no-flow point, moves away from its position as a result of the abrupt increase in viscosity; the resulting tilting motion triggers a sensor.

Examples of polyester polyols which can have such a no-flow point are reaction products of phthalic acid, phthalic anhydride or symmetric α,ω-$C_4$- to $C_{10}$-dicarboxylic acids with one or more $C_2$- to $C_{10}$-diols. They preferably have a number-average molecular weight $M_n$ of ≥400 g/mol to ≤6000 g/mol. Suitable diols are especially monoethylene glycol, butane-1,4-diol, hexane-1,6-diol and neopentyl glycol.

Preferred polyester polyols are specified hereinafter, stating their acid and diol components: adipic acid+monoethylene glycol; adipic acid+monoethylene glycol+butane-1,4-diol; adipic acid+butane-1,4-diol; adipic acid+hexane-1,6-diol+neopentyl glycol; adipic acid+hexane-1,6-diol; adipic acid+butane-1,4-diol+hexane-1,6-diol; phthalic acid/anhydride+monoethylene glycol+trimethylolpropane; phthalic acid/anhydride+monoethylene glycol. Preferred polyurethanes are obtained from a mixture comprising IPDI and HDI as polyisocyanate component and a polyol component comprising an aforementioned preferred polyester polyol. Particular preference is given to the combination of a mixture comprising IPDI and HDI as polyisocyanate component with a polyester polyol formed from adipic acid+butane-1,4-diol+hexane-1,6-diol for formation of the polyurethanes.

It is further preferable that these polyester polyols have an OH number (DIN 53240) of ≥25 to ≤170 mg KOH/g and/or a viscosity (75° C., DIN 51550) of ≥50 to ≤5000 mPas.

One example is a polyurethane obtainable from the reaction of a polyisocyanate component and a polyol component, where the polyisocyanate component comprises an HDI and IPDI and where the polyol component comprises a polyester polyol which is obtainable from the reaction of a reaction mixture comprising adipic acid and also hexane-1,6-diol and butane-1,4-diol with a molar ratio of these diols of ≥1:4 to ≤4:1 and which has a number-average molecular weight $M_n$ (GPC, against polystyrene standards) of ≥4000 g/mol to ≤6000 g/mol. Such a polyurethane may have a magnitude of the complex viscosity 10 (determined by viscometry measurement in the melt with a plate/plate oscillation viscometer according to ISO 6721-10 at 100° C. and a shear rate of 1/s) of ≥4000 Pas to ≤160 000 Pas.

A further example of a suitable polyurethane is:
1. Substantially linear polyester polyurethanes having terminal hydroxyl groups as described in EP 0192946 A1, prepared by reaction of
a) polyester diols of molecular weight above 600 and optionally
b) diols from the molecular weight range from 62 to 600 g/mol as chain extenders with
c) aliphatic diisocyanates,
observing an equivalents ratio of hydroxyl groups of components a) and b) to isocyanate groups of component c) of 1:0.9 to 1:0.999, where component a) consists to an extent of at least 80% by weight of polyester diols from the molecular weight range of 4000 to 6000 based on (i) adipic acid and (ii) mixtures of 1,4-dihydroxybutane and 1,6-dihydroxyhexane in a molar ratio of the diols of 4:1 to 1:4.

In the polyester polyurethanes mentioned under 1., it is preferable that component a) consists to an extent of 100% of a polyester diol of the molecular weight range from 4000 to 6000, the preparation of which involved using, as diol mixture, a mixture of 1,4-dihydroxybutane and 1,6-dihydroxyhexane in a molar ratio of 7:3 to 1:2.

In the polyester polyurethanes mentioned under 1., it is also preferable that component c) comprises IPDI and also HDI.

In the polyester polyurethanes mentioned under 1., it is also preferable that the preparation thereof involved also using, as component b), alkanediols selected from the group consisting of: 1,2-dihydroxyethane, 1,3-dihydroxypropane, 1,4-dihydroxybutane, 1,5-dihydroxypentane, 1,6-dihydroxyhexane or a combination of at least two of these, in an amount of up to 200 hydroxyl equivalent percent, based on component a).

It is also possible that the thermoplastic elastomer, after heating to 100° C. and cooling to 20° C. at a cooling rate of 4° C./min, within a temperature interval from 25° C. to 40° C. for ≥1 minute (preferably ≥1 minute to ≤30 minutes, more preferably ≥10 minutes to ≤15 minutes), has a storage modulus G' (determined at the respective temperature with a plate/plate oscillation viscometer according to ISO 6721-10 at a shear rate of 1/s) of ≥100 kPa to ≤1 MPa and, after cooling to 20° C. and storage for 20 minutes, has a storage modulus G' (determined at 20° C. with a plate/plate oscillation viscometer according to ISO 6721-10 at a shear rate of 1/s) of ≥10 MPa.

The present invention also relates to an article at least partly produced by an additive manufacturing method, characterized in that the article has a surface treated by a method according to the invention and said surface has a mean roughness Ra (DIN EN ISO 4287) of ≤100 µm. Preferably, the mean roughness Ra (DIN EN ISO 4287) is of ≤50 µm, more preferably mean roughness Ra (DIN EN ISO 4287) of ≤25 µm.

The invention is elucidated in detail with reference to the figures which follow, but without being restricted thereto. FIGS. 1 to 6 show steps in the method according to the invention.

FIG. 1 shows the situation after step II) of the method according to the invention. An article 100 produced, for example, by a fused deposition method (FDM), the construction material of which comprises, for example, a thermoplastic polyurethane and is at a temperature $T_{G'}$ of 115° C., was provided. The surface 110 of the article 100 has the waviness in construction direction which is frequently characteristic of the FDM method, and which is caused by the layering of the individual filament layers of the construction material one on top of another. The article 100 was enveloped in a flexible plastics pouch 130 as usable in resin infusion systems for production of fiber-reinforced plastics. This plastics pouch 130 thus defines the boundary of the volume 120 in which the article 100 is placed. In the present case, the boundary in the form of the flexible plastics pouch 130 does not have any inflexible sections. The plastics pouch 130 is evacuable by means of a vacuum pump 140, and also fillable in the event of reversal of the direction of air conveying. Suitable material for the plastics pouch 130, owing to its low adhesion to polyurethanes, is a polyethylene polymer.

Figure 2:
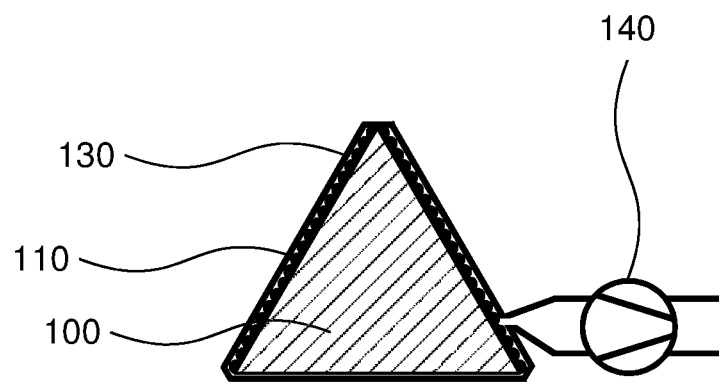
FIG. 2 shows the situation after step III) of the method according to the invention.

FIG. 2 shows the situation after step III) of the method according to the invention. By means of the vacuum pump 140, the volume enclosed by the flexible plastics pouch 130 has been evacuated. The flexible plastics pouch 130 therefore adapts to the surface 110 of the article 100, which exerts a pressure on the surface 110.

Figure 3:
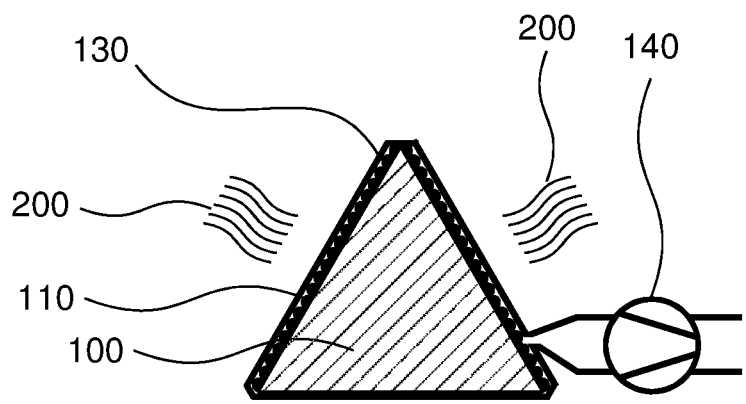
FIG. 3 shows the situation during step IV) of the method according to the invention.

FIG. 3 shows the situation during step IV) of the method according to the invention. Heat radiation 200 shown in schematic form heats the surface 110 of the article 100 through the flexible plastics pouch 130. In the case of a material at a temperature $T_{G'}$ of 115° C., the heat energy supplied may, for example, be such that the surface 110 is heated to a temperature of 120° C. The combination of heat and the pressure exerted by means of the flexible plastics pouch 130 results in controlled deformation of the surface 110. This can be conducted, for example, for a period of 10 minutes.

Figure 4:
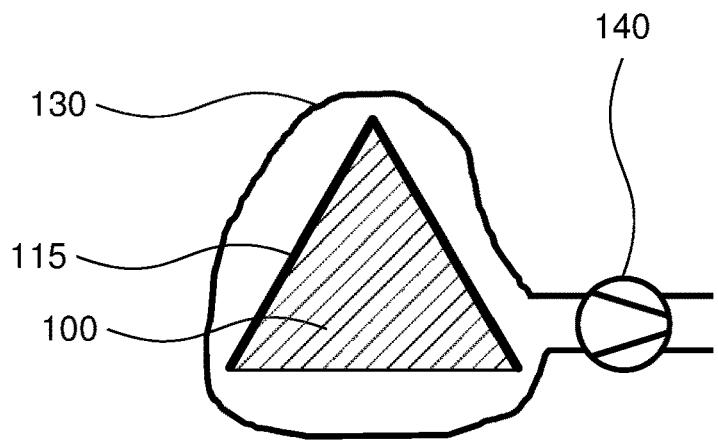
FIG. 4 shows the situation during step III of the method according to the invention.

Subsequently, the surface 110 is cooled to such an extent that its temperature is below the temperature $T_{G'}$. The vacuum pump 140 then conveys air into the interior of the flexible plastics pouch 130, which becomes detached from the surface 115 smoothed in step III). This situation is depicted in FIG. 4.

Figure 5:
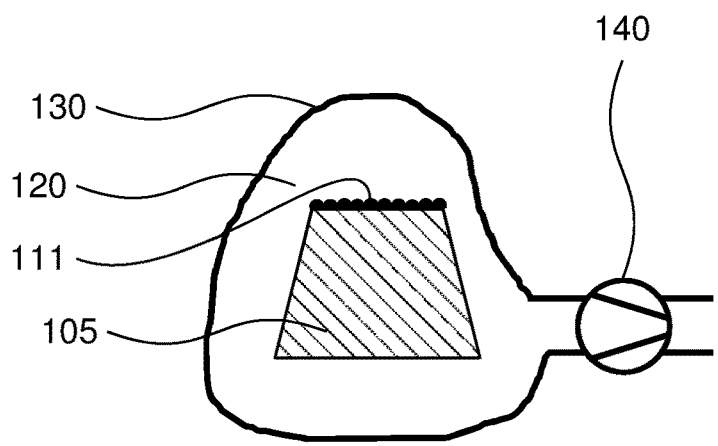
FIG. 5 shows the situation after step II) of the process according to the invention.
Figure 6:
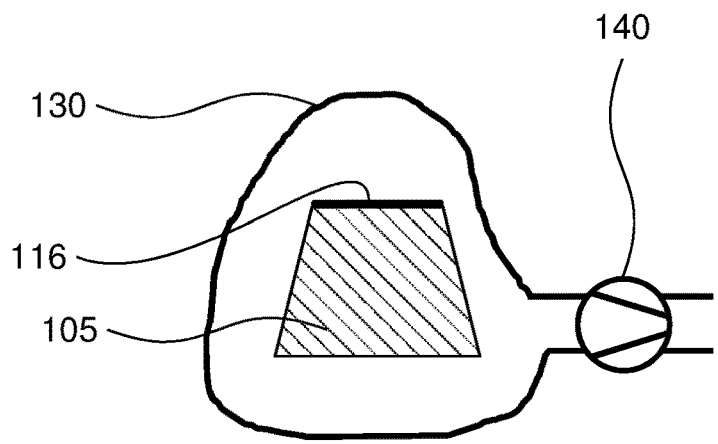
FIG. 6 shows the situation before the substrate with its smoothed surface can be removed from the boundary.

FIGS. 5 and 6 show stations in a method according to the invention where a substrate 105 has been coated with a single layer of the construction material, so as to obtain a surface 111. The surface 115 has the waviness which is frequently characteristic of the FDM method, and which is caused by the laying of the filament strands alongside one another in a layer. This surface is subjected to a smoothing by the method according to the invention, including steps that are analogous to the steps shown in FIGS. 2 and 3 (not shown).

FIG. 5 shows the situation after step II) of the process according to the invention. A substrate 105 coated by a fused deposition method (FDM), the construction material of which comprises, for example, a thermoplastic polyurethane and is at a temperature $T_{G'}$ of 115° C., was provided. This may be an upper material for shoes having a surface formed by FDM. This arrangement was enveloped in a flexible plastics pouch 130 as usable in resin infusion systems for production of fiber-reinforced plastics. This plastics pouch 130 thus defines the boundary of the volume 120 in which the coated substrate is placed. In the present case, the boundary in the form of the flexible plastics pouch 130 does not have any inflexible sections. The plastics pouch 130 is evacuable by means of a vacuum pump 140, and also fillable in the event of reversal of the direction of air conveying. Suitable material for the plastics pouch 130, owing to its low adhesion to polyurethanes, is a polyethylene polymer.

FIG. 6 shows the situation before the substrate 105 with its smoothed surface 116 can be removed from the boundary.

Example

The invention is also elucidated by the example which follows, but without being restricted thereto.

Specimens were produced by means of an FDM method from the construction material DESMOPAN 3690 AU, a polyester-based thermoplastic polyurethane available from Covestro AG, Leverkusen, Germany, which has a Shore hardness (DIN ISO 7619-1) of 90-94 Shore A and is at a temperature $T_{G'}$ at which the storage modulus G' (determined by dynamic-mechanical analysis according to ISO 6721 at a shear rate of 1/s) is 10 MPa, of 118° C. The temperature figures reported have a method-related error of ±2° C., since the process is a dynamic process in which it was not possible to read off the temperature more accurately for the given storage modulus of 10 MPa.

In a vacuum lamination system with a heatable, smooth metal base, the specimens were covered with a covering film integrated into the lid of the system, and a vacuum of 500 mbar was applied within the evacuable volume formed by the metal base and the covering film. The metal base was heated to 120° C. After a duration of 15 minutes, the vacuum applied was ended and the covering film was removed. The outcome of a visual and tactile comparison of the surfaces of the specimens by experienced technicians was that the surfaces after treatment were much smoother and there were no apparent grooves on the surface.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant reserves the right to amend the claims during prosecution to add features as variously described in this specification, and such amendments comply with the requirements of 35 U.S.C. § 112(a), and 35 U.S.C. § 132(a).

Various aspects of the subject matter described herein are set out in the following numbered clauses:

1. Method of treating at least a part of a surface (110, 111) of an article (100, 105), comprising the step of:
I) providing the article (100, 105), at least a part of the surface (110, 111) of the article having been produced by an additive manufacturing method from a construction material, and the construction material provides a temperature $T_{G'}$ at which the storage modulus G' of the construction material (determined by dynamic-mechanical analysis according to ISO 6721 at a shear rate of 1/s) is 10 MPa;
characterized in that the treating of at least a part of the surface (110, 111) comprises the action of pressure on the surface at a temperature of the surface above the temperature $T_{G'}$.

2. Method according to clause 1, characterized in that the method further comprises the steps of:
II) placing the article (100, 105) into an evacuable volume (120) having a boundary (130) comprising flexible sections intended for contact with the surface (110, 111) of the article, wherein the material for the boundary (130) is selected such that it does not enter into any permanent bond with the construction material that has been heated above its temperature $T_{G'}$ and then cooled below its temperature $T_{G'}$;
III) evacuating the volume (120), such that at least some of the flexible sections of the boundary (130) of the volume (120) come into contact with the surface (110, 111) of the article (100, 105);
IV) heating at least a portion of the surface (110, 111) of the article (100, 105), while the volume (120) still remains evacuated, for a predetermined period of time to a temperature above the temperature $T_{G'}$;
V) cooling the surface (115, 116) of the article (100, 105) to a temperature below the temperature $T_{G'}$;
VI) removing the article (100, 105) from the volume (120).

3. Method according to clause 2, characterized in that the boundary (130) of the evacuable volume (120) does not have any inflexible sections.

4. Method according to clauses 2 or 3, characterized in that the material of the flexible sections of the boundary (130) of the evacuable volume (120) is selected from the group comprising: polyethylene, polypropylene, polyvinyl chloride, polytetrafluoroethylene or a combination of at least two of these.

5. Method according to any of clauses 2 to 4, characterized in that the material of the flexible sections of the boundary (130) of the evacuable volume (120) is selected from the group comprising: crosslinked polyethylene, crosslinked polypropylene, crosslinked polyvinyl chloride, crosslinked polytetrafluoroethylene, silicone rubber, fluorosilicone rubber, fluoro rubber or a combination of at least two of these.

6. Method according to any of clauses 2 to 5, characterized in that, in step II), the flexible sections of the boundary (130) exert an average pressure of ≥10 kPa to ≤1000 kPa on the surface (110, 111) of the article (100).

7. Method according to any of clauses 1 to 6, characterized in that the production of the article by means of the additive manufacturing method comprises the steps of:
applying a layer of particles including the construction material to a target surface;
introducing energy into a selected portion of the layer corresponding to a cross section of the article such that the particles in the selected portion are bonded;
repeating the steps of applying and introducing energy for a multitude of layers, such that the bonded portions of the adjacent layers become bonded in order to form the article.

8. Method according to clause 7, characterized in that the introducing of energy into a selected portion of the layer corresponding to a cross section of the article such that the particles in the selected portion are bonded comprises the following step:
irradiating a selected portion of the layer corresponding to a cross section of the article with a beam of energy, such that the particles in the selected portion are bonded.

9. Method according to clause 7, characterized in that the introducing of energy into a selected portion of the layer corresponding to a cross section of the article such that the particles in the selected portion are bonded comprises the following steps:
applying a liquid to a selected portion of the layer corresponding to a cross section of the article, where said liquid increases the absorption of the energy introduced in the regions of the layer with which it comes into contact relative to the regions with which it does not come into contact;
irradiating the layer such that the particles in regions of the layer that come into contact with the liquid are bonded to one another and the particles in regions of the layer that do not come into contact with the liquid are not bonded to one another.

10. Method according to any of clauses 1 to 6, characterized in that the production of the article by means of the additive manufacturing method comprises the steps of:
applying a filament of an at least partly molten construction material to a carrier, such that a layer of the construction material is obtained, corresponding to a first selected cross section of the article;
optionally applying a filament of the at least partly molten construction material to a previously applied layer of the construction material, such that a further layer of the construction material is obtained, which corresponds to a further selected cross section of the article and which is bonded to the layer applied beforehand;
optionally repeating the step of applying a filament of the at least partly molten construction material to a previously applied layer of the construction material until the article has been formed.

11. Method according to any of clauses 1 to 10, characterized in that the construction material comprises a thermoplastic polyurethane elastomer having a melting range (DSC, differential scanning calorimetry; second heating at a heating rate 5 K/min) of ≥20° C. to ≤200° C., a Shore hardness according to DIN ISO 7619-1 of ≥40 A to ≤85 D and a melt volume rate (MVR) according to ISO 1133 (190° C., 10 kg) of ≥25 to ≤190 cm³/10 min, preferably of ≥25 to ≤90 cm³/10 min.

12. Method according to any of clauses 1 to 11, characterized in that the construction material comprises a thermoplastic polyurethane elastomer having
a melting range (DSC, differential scanning calorimetry; second heating at heating rate 5 K/min) of ≥20° C. to ≤240° C., preferably of ≥20° C. to ≤200° C.,
a Shore A hardness according to DIN ISO 7619-1 of ≥40 A to ≤85 D,
a melt volume rate (MVR) according to ISO 1133 (10 kg) at a temperature, T, of 5 to 15 cm³/10 min and
a change in the melt volume rate (10 kg) in the event of an increase in this temperature, T, by 20° C. of ≤90 cm³/10 min.

13. Method according to any of clauses 1 to 12, wherein the construction material comprises a thermoplastic polyurethane elastomer obtainable from the reaction of the following components:
a) at least one organic diisocyanate
b) at least one compound having groups reactive toward isocyanate groups and having a number-average molecular weight ($M_n$) of ≥500 g/mol to ≤6000 g/mol and a number-average functionality of the totality of the components covered by b) of ≥1.8 to ≤2.5
c) at least one chain extender having a molecular weight (Mn) of 60-450 g/mol and a number-average functionality of the totality of the chain extenders covered by c) of 1.8 to 2.5.

14. Method according to any of clauses 1 to 10, characterized in that the construction material comprises a thermoplastic polyurethane elastomer having a melting range (DSC, differential scanning calorimetry; 2nd heating at a heating rate 5 K/min) of ≥20° C. to ≤100° C. and a magnitude of the complex viscosity 10 (determined by viscometry measurement in the melt with a plate/plate oscillation shear viscometer at 100° C. and a shear rate of 1/s) of ≥10 Pas to ≤1 000 000 Pas.

15. Method according to any of clauses 1 to 14, characterized in that the construction material comprises a thermoplastic polyurethane elastomer obtainable from the reaction of a polyisocyanate component and a polyol component, said polyol component comprising a polyester polyol having a pour point (ASTM D5985) of ≥25° C.

16. Article at least partly produced by an additive manufacturing method, characterized in that the article has a surface treated by a method according to any of clauses 1 to 15 and said surface has a mean roughness Ra (DIN EN ISO 4287) of ≤100 μm.

The invention claimed is:

1. A method of treating at least a part of a surface of an article comprising the steps of:
I) providing the article at least a part of the surface of the article having been produced by an additive manufacturing method from a construction material, and the construction material provides a temperature $T_{G'}$ at which the storage modulus G' of the construction material (determined by dynamic-mechanical analysis according to ISO 6721 at a shear rate of 1/s) is 10 MPa, wherein the treating of at least a part of the surface comprises the action of pressure on the surface at a temperature of the surface above the temperature $T_{G'}$;
II) placing the article into an evacuable volume having a boundary comprising flexible sections intended for contact with the surface of the article, wherein the material for the boundary is selected such that it does not enter into any permanent bond with the construction material that has been heated above its temperature $T_{G'}$ and then cooled below its temperature $T_{G'}$;
III) evacuating the volume, such that at least some of the flexible sections of the boundary of the volume come into contact with the surface of the article;
IV) heating at least a portion of the surface of the article, while the volume still remains evacuated, for a predetermined period of time to a temperature above the temperature $T_{G'}$;
V) cooling the surface of the article to a temperature below the temperature $T_{G'}$;
VI) removing the article from the volume.

2. The method according to claim 1, wherein the boundary of the evacuable volume does not have any inflexible sections.

3. The method according to claim 1, wherein the material of the flexible sections of the boundary of the evacuable volume is selected from the group consisting of polyethylene, polypropylene, polyvinyl chloride, polytetrafluoroethylene and a combination of at least two of these.

4. The method according to claim 1, wherein the material of the flexible sections of the boundary of the evacuable volume is selected from the group consisting of crosslinked polyethylene, crosslinked polypropylene, crosslinked polyvinyl chloride, crosslinked polytetrafluoroethylene, silicone rubber, fluorosilicone rubber, fluoro rubber and a combination of at least two of these.

5. The method according to claim 1, wherein, in step II), the flexible sections of the boundary exert an average pressure of ≥10 kPa to ≤1000 kPa on the surface of the article.

6. The method according to claim 1, wherein production of the article by means of the additive manufacturing method comprises the steps of:
applying a layer of particles including the construction material to a target surface;
introducing energy into a selected portion of the layer corresponding to a cross section of the article such that the particles in the selected portion are bonded;
repeating the steps of applying and introducing energy for a multitude of layers, such that the bonded portions of the adjacent layers become bonded in order to form the article.

7. The method according to claim 6, wherein the introducing of energy into a selected portion of the layer corresponding to a cross section of the article such that the particles in the selected portion are bonded comprises the following step:
irradiating a selected portion of the layer corresponding to a cross section of the article with a beam of energy, such that the particles in the selected portion are bonded.

8. The method according to claim 6, wherein the introducing of energy into a selected portion of the layer corresponding to a cross section of the article such that the particles in the selected portion are bonded comprises the following steps:
applying a liquid to a selected portion of the layer corresponding to a cross section of the article, where said liquid increases the absorption of the energy introduced in the regions of the layer with which it comes into contact relative to the regions with which it does not come into contact;

irradiating the layer such that the particles in regions of the layer that come into contact with the liquid are bonded to one another and the particles in regions of the layer that do not come into contact with the liquid are not bonded to one another.

9. The method according to claim 1, wherein production of the article by means of the additive manufacturing method comprises the steps of:

applying a filament of an at least partly molten construction material to a carrier, such that a layer of the construction material is obtained, corresponding to a first selected cross section of the article;

optionally applying a filament of the at least partly molten construction material to a previously applied layer of the construction material, such that a further layer of the construction material is obtained, which corresponds to a further selected cross section of the article and which is bonded to the layer applied beforehand;

optionally repeating the step of applying a filament of the at least partly molten construction material to a previously applied layer of the construction material until the article has been formed.

10. The method according to claim 1, wherein the construction material comprises a thermoplastic polyurethane elastomer having a melting range (DSC, differential scanning calorimetry; second heating at a heating rate 5 K/min) of ≥20° C. to ≤200° C., a Shore hardness according to DIN ISO 7619-1 of ≥40 A to ≤85 D and a melt volume rate (MVR) according to ISO 1133 (190° C., 10 kg) of ≥25 to ≤190 cm$^3$/10 min, preferably of ≥25 to ≤90 cm$^3$/10 min.

11. The method according to claim 1, wherein the construction material comprises a thermoplastic polyurethane elastomer having a melting range (DSC, differential scanning calorimetry; second heating at a heating rate 5 K/min) of ≥20° C. to ≤240° C., preferably of ≥20° C. to ≤200° C., a Shore A hardness according to DIN ISO 7619-1 of ≥40 A to ≤85 D, a melt volume rate (MVR) according to ISO 1133 (10 kg) at a temperature, T, of 5 to 15 cm$^3$/10 min and a change in the melt volume rate (10 kg) in the event of an increase in this temperature, T, by 20° C. of ≤90 cm$^3$/10 min.

12. The method according to claim 1, wherein the construction material comprises a thermoplastic polyurethane elastomer obtained from reaction of the following components:

a) at least one organic diisocyanate b) at least one compound having groups reactive toward isocyanate groups and having a number-average molecular weight ($M_n$) of ≥500 g/mol to <6000 g/mol and a number-average functionality of the totality of the components covered by b) of ≥1.8 to ≤2.5 c) at least one chain extender having a molecular weight (Mn) of 60-450 g/mol and a number-average functionality of the totality of the chain extenders covered by c) of 1.8 to 2.5.

13. The method according to claim 1, wherein the construction material comprises a thermoplastic polyurethane elastomer having a melting range (DSC, differential scanning calorimetry; 2nd heating at a heating rate 5 K/min.) of ≥20° C. to ≤100° C. and a magnitude of the complex viscosity |η*| (determined by viscometry measurement in the melt with a plate/plate oscillation shear viscometer at 100° C. and a shear rate of 1/s) of ≥10 Pas to ≤1 000 000 Pas.

14. The method according to claim 1, wherein the construction material comprises a thermoplastic polyurethane elastomer obtained from the reaction of a polyisocyanate component and a polyol component, said polyol component comprising a polyester polyol having a pour point (ASTM D5985) of ≥25° C.

* * * * *